Patented Aug. 4, 1925.

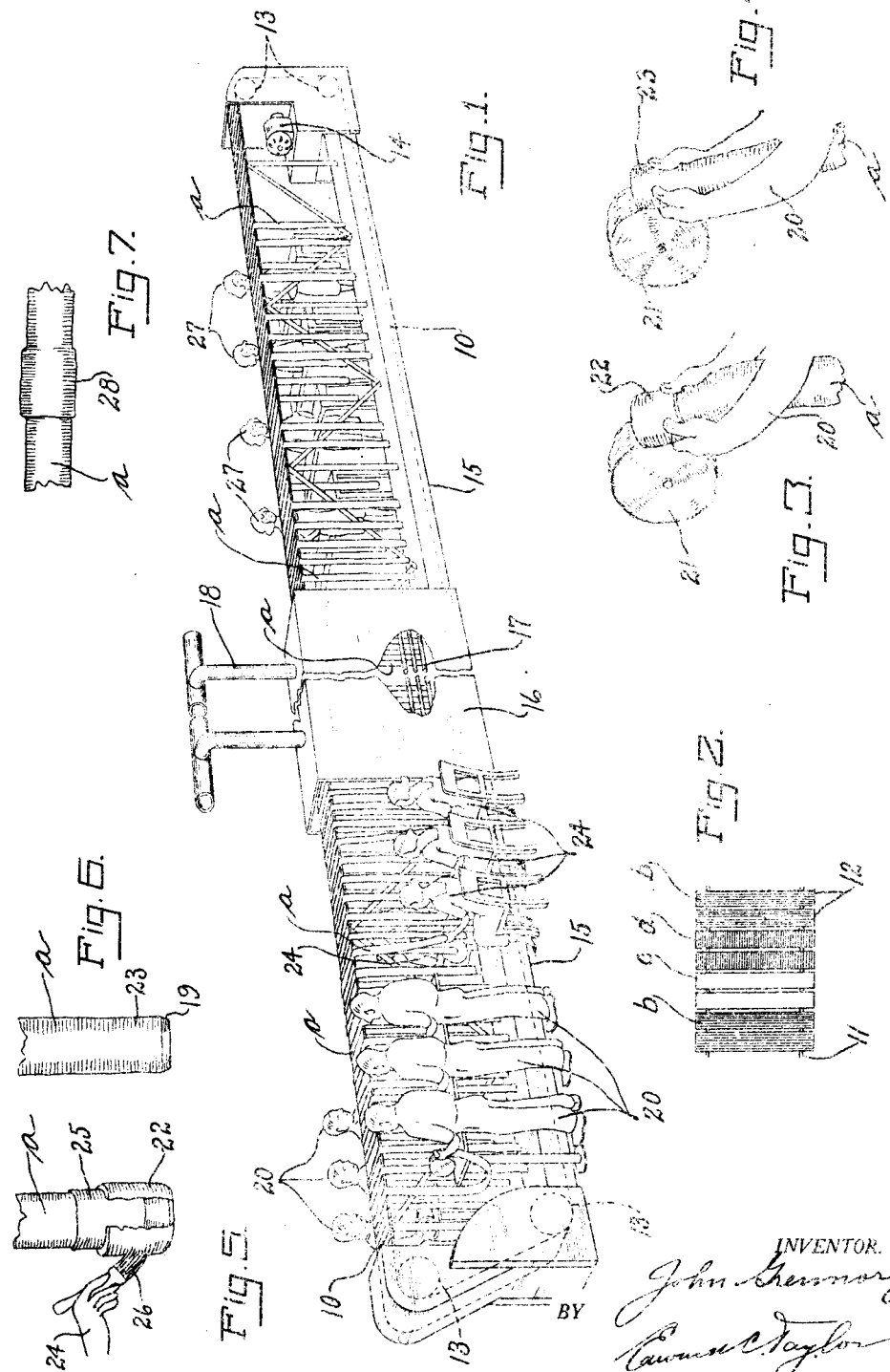

1,548,361

UNITED STATES PATENT OFFICE.

JOHN GRENNOR, JR., OF CHICOPEE, MASSACHUSETTS, ASSIGNOR TO THE FISK RUBBER COMPANY, OF CHICOPEE FALLS, MASSACHUSETTS, A CORPORATION OF MASSACHUSETTS.

TUBE SPLICING.

Application filed April 2, 1923. Serial No. 629,477.

*To all whom it may concern:*

Be it known that I, JOHN GRENNOR, Jr., a citizen of the United States of America, residing at Chicopee, in the county of Hampden and State of Massachusetts, have invented certain new and useful Improvements in Tube Splicing, of which the following is a specification.

The present invention relates to the splicing of rubber tubes to form endless annular tubes such as are used inside of the usual vehicle tire casing, particularly to the preliminary steps of preparing the tube for the splicing. It has for its object the improvement of the spliced tubes in conditions of uniformity and strength of splice and freedom from defects; and of the process of splicing the tubes in conditions of facility and reliability of operation. Other specific objects can be understood best from the following description.

In the building of endless annular tubes for automobile tire casings they are customarily built and vulcanized upon a mandrel, either straight or curved, from which they are stripped after vulcanization. The stripped tubes, usually inverted so as to bring the smooth surface outside, are now ready for splicing, which is accomplished by cementing the ends of the tube, slipping one end over the other, and curing the tube either by heat or by the cold or "acid" process. The previously known manner of preparing the tubes for splicing consisted in piling the stripped tubes on racks or trucks; carrying them to an operator who skived or beveled the ends of the tube; again piling them and carrying them to an operator who buffed the ends of the tube where they were to be cemented; again piling them and carrying them to stands where they are cemented and where they stand until the cement is dry; and again piling the tubes and carrying them to the splicing operators. In practicing this former process great fluctuations have been noticed in the character of the product. Many attempts have been made to combat these difficulties. In spite of these attempts an apparently uncontrollable percentage of defective splices has resulted, particularly in humid weather.

I have found that these defects are primarily due to the blooming of the rubber and to the collection of moisture on the surface of the rubber and on the cement. According to the former methods there was no appreciation of the importance of the time element between the several operations. By my experiments in practical tube production I have found that the accurate control of this element is of great importance in a reduction and stabilization of the percentage of defective splices.

It is well recognized that vulcanized rubber, if allowed to stand, will bloom or show on its surface an accumulation of fine crystals of free sulfur which has migrated from the body of the rubber. This bloom or sulfur dust will prevent perfect adhesion of the rubber in the cement to the underlying rubber of the tube, both because of the lack of cohesion between the rubber and this surface dust and because the sulfur dust prevents the solvent in the cement from striking into the tube rubber and effecting a blending between it and the cement. With the methods formerly in use it was impossible to control this formation of bloom because varying times elapsed between the buffing and cementing operations. The last tube to be buffed would be among the first to be cemented. This tube would probably show a satisfactory splice, whereas the first tube to be buffed would be among the last of the pile to be taken for cementing, and would probably show a defective splice, particularly when the other conditions mentioned hereafter were adverse. In any case there would be large and apparently uncontrollable fluctuations in the percentage of defective splices in continued commercial production. A similar difficulty has also arisen due to overexposure to the air of the tube between the cementing and splicing operations. Controlled time conditions are also desirable here so that all cemented tubes will be spliced under uniform circumstances.

I believe the main reason why this condition has not been understood in the past is because of the generally made assumption that only a large or easily visible amount of bloom need be considered dangerous to the splice. I have found by my experiments, however, that it is important to have the cement contact as far as possible with the clean rubber surface as it comes from the buffer, before the latter has had a chance to accumulate any bloom. The manner in which this result is assured with uniformity for all tubes will appear below.

Moisture between the rubber and the cement, or between the layers of cement on the overlapping portions of the spliced tube, will cause non-adhesion of adjacent rubber surfaces; and, if a steam cure is used in vulcanizing the splice, will cause blowing or blistering due to the volatilization and consequent expansion of the moisture. The accumulation of this moisture varies with the humidity of the atmosphere and with the temperature of the tube, which may in the old processes be lower than the temperature of the atmosphere where the tubes are being cemented. I have found, however, that by following the process described below the moisture will not be permitted to form and a more uniformly good product will result.

In practice I find it convenient to combine the limitation of bloom and moisture in one stage, and to unite the steps taken for these purposes with others which will appear below. Before considering the preferred manner of carrying out the process in detail its more general characteristics may be discussed. Buffing is generally accomplished by pressing the surface to be treated against a rapidly revolving wire brush or other abrasive wheel. This scratches or abrades the surface of the rubber so that all dirt and bloom is removed and a fresh surface of rubber is presented. The friction of this operation warms the tube at the point where it is buffed, and this warming, together with the mechanical removal of the surface, eliminates any moisture from the buffed portion. If now the tube so prepared is cemented before it cools sufficiently to permit moisture to condense on it, defects due to the presence of moisture between the rubber and cement will be eliminated. Furthermore, if the cement is applied before the buffed tube has had time to cool the danger of bloom will be eliminated, as no injurious blooming can occur in so short a time. Cementing on the warm rubber surface has also the advantage of creating a better adhesion between the cement and rubber than if the rubber were cold. In dry climates, or where for any other reason the atmospheric humidity is low, the time between the buffing and cementing need not be so short as to keep the tube warm when it is cemented, but still the time should be so short as to permit no appreciable blooming of the rubber. I prefer, therefore, to pass the tubes directly and successively from the buffing to the cementing, so that all tubes will be treated the same and variations in the character of the splices due to production conditions will be avoided. For a similar reason, to avoid condensation of moisture on the cemented portion of the tubes before splicing, due to the cooling of the tube by evaporation of the cement, the cement is preferably dried while the tube is warmed and the tubes are delivered to the splicing operators successively and before they have had time to cool sufficiently to permit any accumulation of moisture.

A further difficulty experienced with tube splicing processes formerly in use was that there was, during the handling of the tubes after cementing, an inevitable contact between cemented surfaces and between these surfaces and other objects. Even where the precaution was taken of placing protective strips of holland cloth or other material between adjacent tubes, difficulty was experienced due to some of the filler with which the holland cloth is impregnated coming off on the cement, causing lack of adhesion in the later formed splice, and to some of the cement being pulled off by the cloth. Where contact of any kind occurs, whether between the several tubes or between the tubes and other objects such as the trucks or even the protective strips, some tubes will suffer due to the cement becoming separated or stripped from the rubber, and from dirt being deposited on the cement. This cause combined with the others mentioned to produce a large and fluctuating percentage of defective splices. In practicing the method forming this invention I preferably avoid also these troubles by supporting the tubes throughout their treatment so that their ends will not be in danger of accidental contact with each other or with other objects.

The manner in which these several features are carried out in the practical working of the invention will now be described in connection with the accompanying drawings, in which—

Fig. 1 is a perspective view showing one manner of practicing the invention;

Fig. 2 is a detail of the apparatus shown in Fig. 1;

Fig. 3 is a detail illustrating the buffing of one end of a tube;

Fig. 4 is a similar detail showing the buffing of the other end of the tube;

Fig. 5 is a detail showing the cementing of one end of a tube;

Fig. 6 is a detail of the other end of the tube; and

Fig. 7 is a detail of the splice.

In order to insure equal treatment for all tubes in respect to time elapsed between successive operations, thereby affording control of the important time element as discussed above, and to hold the tubes with their ends free and out of contact, the tubes are preferably supported and moved through successive operations upon a moving surface such as a conveyor 10. This conveyor may be of any suitable construction so as to support the central portion of the tubes and permit the side portions to hang free. As shown the conveyor 10 comprises belts or chains 11 (Fig. 2) having cross slats 12 colored in sequence, as *b*, *c*, and *d*, for a purpose to appear. The conveyor is supported by pulleys 13 and is driven at a slow but steady rate of speed by a motor 14. The pulleys 13 are supported in a suitable framework, and suitable provision is made for supporting the upper and lower runs of the conveyor between the end pulleys, as is well understood by those familiar with the installation of conveyors. The lower run of the conveyor preferably passes through a housing 15 serving to protect it from the dropping of cement or buffed-off particles. Intermediate of its length the top run of the conveyor passes through a chamber 16, heated as by steam pipes 17 and provided with suitable ventilating devices indicated generically by 18. The mechanical structure of the described apparatus may be varied widely, as my invention relates to the manner of treating the tubes rather than to the detailed apparatus for carrying it out.

The tubes are placed on the conveyor at the end to the left in Fig. 1 in a state ready for buffing. They are therefore preferably trimmed to length, and skived or beveled as indicated at 19 (Fig. 6), although the exact treatment prior to this point is not material. By the steady travel of the conveyor these tubes are brought to operators 20, each of whom is provided with a power driven buffing wheel 21, preferably provided with the usual suction hood (not shown). One end of the tube is cuffed or bent back on itself as indicated at 22, so that the buffing and cementing will be done on what is to be the inside of the tube, while the other end is left straight as at 23. The operators 20 on one side of the conveyor operate on one end of the tubes while those opposite work on the other end.

I have found a suitable speed for the conveyor to be in the neighborhood of six feet per minute, although I do not limit myself to that figure. If the tubes are spaced about six inches apart they will pass along faster than one man could thoroughly buff them. For this reason I have shown three operators on each side of the conveyor, who work selectively on separate tubes. For indicating to the workmen which tubes they are to take, use is made of the colored cross slats *b*, *c*, and *d*. By each workman taking only the tubes on his particular color, all the tubes will be treated with ample time allowed for each.

The movement of the conveyor takes the tubes individually and successively from the buffing operators to operators 24, similarly arranged on opposite sides of the conveyor, who cement the ends of the tubes. Preferably, in order to prevent the undesired application of cement to the body of the tube, a protecting strip 25 of holland cloth or other suitable material is inserted under the turned back portion 22. The cement is conveniently applied to the buffed portions 22 and 23 by a brush 26. As shown, three cementing operators have been stationed on each side of the conveyor, corresponding to the three buffing operators 20. It is generally preferable to place two coats of cement on the tubes, and in this case the first operator cements the tubes on slats *b* and *c*, the second operator those on slats *c* and *d*, and the third operator those on slats *b* and *d*.

From the cementing operators the tubes are carried individually and successively through the drying chamber 16 (shown broken away and therefore not in its full length). On emerging from the far end of the drying chamber the tubes are ready for splicing. Stationed adjacent the conveyor at this point are splicing operators 27, who take from the conveyor the tubes on the proper colored slats and form the splice 28 (Fig. 7) in any suitable manner, such for example as the method shown in the patent to Harrison, No. 1,311,392, dated July 29, 1919.

It will be seen that controlled time conditions are obtained in this manner by all tubes, and that by presenting the tubes individually and successively from one operation to the next throughout the process the difficulties referred to above will be avoided.

Having thus described my invention, I claim:

1. In a method of splicing rubber tubes, supporting a small central length of the tubes leaving the ends of each tube freely suspended, continuously moving the central portion of the tube to control the sequence and frequency of the operations to be performed, buffing and cementing the ends of the tubes while temporarily arresting the ends but not the middle of the tubes, drying the cement while the tubes are still so suspended, and presenting the tubes successively for splicing.

2. In a method of splicing rubber tubes, buffing the ends of the tubes on the surfaces which are to overlap when spliced, supporting a small central length of the tubes while leaving the ends of each tube freely suspended and out of contact with each other, cementing the buffed portions while so supported and successively and immediately after the buffing, carrying the cemented tubes while so supported through a drying chamber, and presenting the tubes individually and successively from the drying chamber for splicing, whereby controlled time conditions are maintained and formation of bloom on the buffed portions is avoided.

JOHN GRENNOR, Jr.